United States Patent
Yang et al.

(10) Patent No.: US 8,966,056 B2
(45) Date of Patent: Feb. 24, 2015

(54) UNIFORM SERVICE ACCESS SYSTEM AND ACCESS METHOD

(75) Inventors: Jianjun Yang, Shenzhen (CN); Shengbo Luo, Shenzhen (CN); Fang Jie, Shenzhen (CN); Sanping Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 545 days.

(21) Appl. No.: 12/739,725

(22) PCT Filed: Dec. 25, 2007

(86) PCT No.: PCT/CN2007/003790
§ 371 (c)(1),
(2), (4) Date: Apr. 23, 2010

(87) PCT Pub. No.: WO2009/052673
PCT Pub. Date: Apr. 30, 2009

(65) Prior Publication Data
US 2010/0306396 A1    Dec. 2, 2010

(30) Foreign Application Priority Data

Oct. 24, 2007   (CN) .......................... 2007 1 0176303

(51) Int. Cl.
*G06F 15/173*   (2006.01)
*H04L 29/06*   (2006.01)
*H04Q 3/00*   (2006.01)

(52) U.S. Cl.
CPC .......... *H04L 65/1096* (2013.01); *H04Q 3/0025* (2013.01); *H04Q 3/0045* (2013.01); *H04Q 3/0054* (2013.01)
USPC ....................................................... 709/224

(58) Field of Classification Search
CPC .............. H04L 29/06027; H04L 63/10; H04L 65/1006; H04L 67/14
USPC ......................... 709/230, 231, 232
See application file for complete search history.

(56) References Cited

U.S. PATENT DOCUMENTS 5,732,213 A * 3/1998 Gessel et al. .................. 709/224
5,793,771 A * 8/1998 Darland et al. ............... 370/467
(Continued)

FOREIGN PATENT DOCUMENTS

| CH | 1787461 A | 6/2006 |
| CN | 1819666 A | 8/2006 |

OTHER PUBLICATIONS

International Search Report and Written Opinion in International Application No. PCT/CN2007/003790, mailed Aug. 14, 2008.
(Continued)

*Primary Examiner* — Karen Tang
(74) *Attorney, Agent, or Firm* — Li & Cai Intellectual Property (USA) Office

(57) ABSTRACT

A uniform service access system is provided by the present invention, comprising: service providing means; a PARLAY state machine, configured to trigger an application service of the service providing means according to service request information and to generate call control information according to the application service information; a PARLAY adapter, configured to realize the conversion of the information transmission formats between the PARLAY state machine and a network state machine; the network state machine, configured to send uplink call generating service request information to the PARLAY adapter and to send downlink call control information to a network protocol adapter, the network protocol adapter, configured to realize a conversion of information transmission formats between the network state machine and a service switch equipment; the service switch equipment configured to trigger the application service according to a terminal call and to control a call according to the call control information from the network protocol adapter. An access method is further provided correspondingly. The present invention can realize an intelligent service supporting different network access.

8 Claims, 2 Drawing Sheets

(56) References Cited

U.S. PATENT DOCUMENTS

| | | | |
|---|---|---|---|
| 6,151,390 A * | 11/2000 | Volftsun et al. | 379/229 |
| 6,519,266 B1 | 2/2003 | Manning et al. | |
| 2006/0198334 A1 | 9/2006 | Civanlar et al. | |
| 2007/0100981 A1 * | 5/2007 | Adamczyk et al. | 709/223 |
| 2007/0183403 A1 * | 8/2007 | Somers | 370/352 |
| 2007/0217597 A1 * | 9/2007 | Tiedemann et al. | 379/266.07 |
| 2007/0243891 A1 * | 10/2007 | Civanlar et al. | 455/466 |
| 2007/0283385 A1 * | 12/2007 | Qiu et al. | 725/34 |
| 2008/0232567 A1 * | 9/2008 | Maes | 379/201.12 |
| 2008/0267376 A1 * | 10/2008 | Khasnabish | 379/201.01 |
| 2008/0304500 A1 * | 12/2008 | Schliserman et al. | 370/401 |
| 2010/0296408 A1 * | 11/2010 | Mitsumori et al. | 370/252 |
| 2010/0317317 A1 * | 12/2010 | Maier et al. | 455/404.2 |
| 2011/0191486 A1 * | 8/2011 | Agrawal et al. | 709/230 |
| 2011/0243126 A1 * | 10/2011 | Witzel et al. | 370/352 |

OTHER PUBLICATIONS

Lei Li, Jun Lu, "The Evolution From the Traditional Intelligent Network to OSA", Study on Optical Communication, 2004 (Sum. No. 121),China Academic Journal Electronic Publish.

Extended European Search Report issued by EPO (European Patent Office) on Mar. 26, 2013.

Office Action issued on a couterpart application in China by the China Patent Office on Apr. 3, 2009.

* cited by examiner

UNIFORM SERVICE ACCESS SYSTEM AND ACCESS METHOD

CROSS REFERENCE TO RELATED APPLICATIONS

This Application is a United States National Stage Application filed under 35 U.S.C. 371 of International Application No. PCT/CN2007/003790, entitled "Uniform Service Access System And Access Method" which was filed on Dec. 25, 2007, which claims the benefit of and priority to Chinese Patent Application No. 200710176303.9, filed on Oct. 24, 2007, the disclosure of which is hereby incorporated by reference.

FIELD OF THE INVENTION

The present invention relates to intelligent network service, in particular to a uniform service access system and access method.

BACKGROUND OF THE INVENTION

Presently, in the networks, there are simultaneously existing multiple intelligent networks such as fixed intelligent network, Global System for Mobile Communication, GSM, intelligent network, Personal Handphone System, PHS, intelligent network, Code Division Multiple Access, CDMA, intelligent network, Next Generation Network, NGN (wideband) intelligent network. When these intelligent networks provide intelligent services with a uniform service property, it is required that these intelligent networks separately provide the same intelligent service respectively. For example, when providing pre-paid service, the multiple intelligent networks of the fixed intelligent network, the GSM intelligent network, the PHS intelligent network, the CDMA intelligent network, the NGN (wideband) intelligent network, etc. are required to provide pre-paid service, respectively.

Therefore, when a new service emerges and needs to be provided by these intelligent networks, each of which has to develop and load the service, respectively. This service providing mode is of disadvantage to rapidly provide service, and increases the maintenance cost due to the independence of the intelligent services in respect networks. For example, when a pre-paid service is to be upgraded, the pre-paid services of individual networks have to be upgraded respectively.

SUMMARY OF THE INVENTION

Based on above description, the main object of the present invention is to provide a uniform service access system and access method to realize that one service may support different network access.

A uniform service access system which is provided by the present invention comprises:
service providing means, configured to store application service information;
a PARLAY state machine, configured to trigger an application service of the service providing means according to service request information from a PARLAY adapter, and to generate call control information according to the application service information and return to the PARLAY adapter;
the PARLAY adapter, configured to realize the conversion of information transmission formats between the PARLAY state machine and a network state machine;
the network state machine, configured to generate the service request information according to the call from a network protocol adapter and send to the PARLAY adapter, and to send call control information from the PARLAY adapter to the network protocol adapter;
the network protocol adapter, configured to realize a conversion of information transmission formats between the network state machine and a service switch equipment;
the service switch equipment, configured to trigger the application service to report the network protocol adapter according to a call from a network terminal, and to control a current call according to the call control information from the network protocol adapter.

Wherein, the service switch equipment comprises a Service Switch Point, SSP, and a Signaling Interface Unit, SIU.

Wherein, the network state machine and the network protocol adapter comprise at least one of the following combinations: a fixed network state machine and an Intelligent Network Application Protocol, INAP, protocol adapter, a Global System for Mobile Communication, GSM, state machine and a Customised Applications for Mobile Enhanced Logic, CAMEL, protocol adapter, and a Code Division Multiple Access, CDMA, state machine and a Wireless Intelligent Network, WIN, protocol adapter.

Wherein, the system further comprises: a Session Initiation Protocol, SIP, protocol adapter configured to convert the information transmission formats between soft switch equipment and PARLAY state machine; the soft switch equipment, configured to trigger the application service to report the SIP protocol adapter according to a call from the soft switch network.

Correspondingly, the present invention provides an access method for a uniform service access system, which comprises the following steps:
A. a service switch equipment triggers a service according to a call from a network terminal, and converting, through a network protocol adapter, into a format required by a network state machine and transmitting to the network state machine;
B. the network state machine converts, through a PARLAY adapter, call information into a format required by a PARLAY state machine and transmits to the PARLAY state machine;
C. the PARLAY state machine triggers an application service on the service providing means, and the service providing means dispatches a call control to the PARLAY state machine;
D. the PARLAY state machine converts, through a PARLAY protocol adapter, into a format required by the network state machine and transmits to the network state machine;
E. the network state machine converts, through the network protocol adapter, into a format required by a service switch equipment and transmits to the service switch equipment to perform subsequent call.

Optionally, prior to step B, the method further comprises: when the network state machine judges that the call has a contract with the service providing means, step B is performed; when the network state machine judges that the call has a contract with the network service providing means of the network to which the network state machine belongs, triggering the call being to the network service providing means of the network to which the network state machine belongs.

Wherein, step A, i.e., the service switch equipment triggers the service according to the call from the network terminal, and converts, through the network protocol adapter, into the format required by the network state machine, comprises: the service switch equipment triggers the service according to the call of the network terminal, and a System Interface Unit, SIU, converts No. 7 signaling bearing the call into Transfer Control Protocol, TCP/Internet Protocol, IP protocol message and sends to the network protocol adapter; and the network protocol adapter parses the TCP/IP protocol message and converts into an internal format required by the network state machine.

Wherein, step E, i.e., the network state machine converts, through the network protocol adapter into the format required by the service switch equipment and transmits to the service switch equipment, comprises: the network protocol adapter converts a message of internal format into TCP/IP protocol message and sends to the SIU; and the SIU converts the TCP/IP protocol message into the No. 7 signaling format and transmits it to the service switch equipment.

Based on above description, the uniform service access system and access method provided by the present invention can enable one service to support the access of various network protocols, i.e., the access of various intelligent networks. Particularly, it is necessary to provide only one service, but the service supports the access of multi-protocols, such as narrow band fixed network INAP protocol access, the CAMEL protocol access of the PHS and the GSM, the WIN protocol access of the CDMA, the wide band intelligent network access based on the soft switch or the IP Multimedia Sub-system, IMS.

It is obvious that by the present invention, it is only necessary to develop and load a service for one time, so as the accesses of various network protocols are supported, thus it is realized to provide the same intelligent service to various networks, and reduce the repeated development of the service, which is of advantage to rapidly provide a new service. In addition, it is convenient to maintain the service due to the uniform access of the service.

DETAILED DESCRIPTION OF THE EMBODIMENTS

Figure 1:
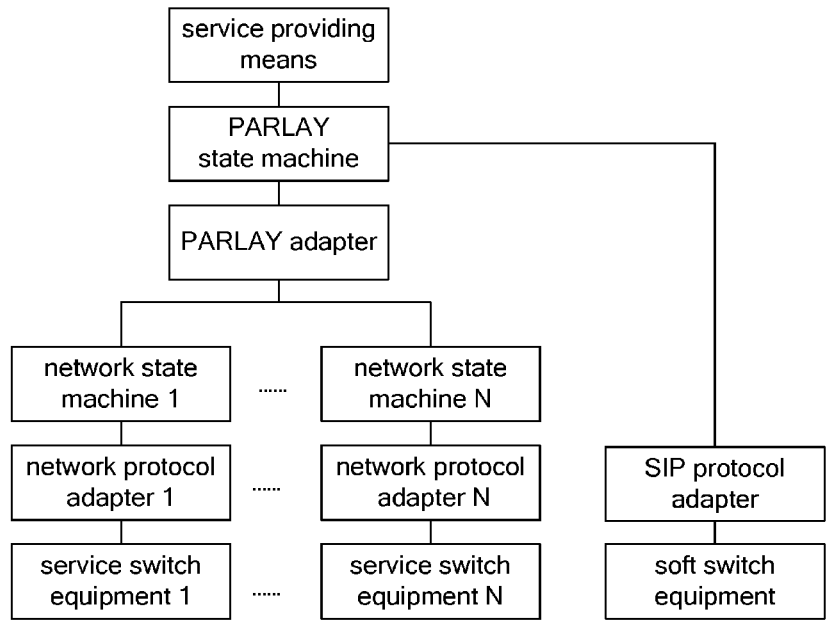
FIG. 1 is a schematic view of the uniform service access system.

FIG. 1 shows the system block view of the uniform service access system, and the system comprises, service providing means, configured to store application service information which is developed based on a PARLAY application interface and to process a call request by a PARLAY state machine; the PARLAY state machine, configured to invoke an application service stored in the service providing means according to service request information from a PARLAY adapter, and to generate call control information according to the invoked application service and to return to the PARLAY adapter; the PARLAY adapter, configured to realize a conversion of information transmission formats between the PARLAY state machine and a network state machine; the network state machine, configured to store various sub-states and associated actions relating to the service, and to generate service request information according to the call from a network protocol adapter and to send to the PARLAY adapter, and to send the call control information from the PARLAY adapter to the network protocol adapter; the network protocol adapter, configured to convert information transmission formats between the network state machine and a service switch equipment; the service switch equipment, configured to access to a call of a network to which it belongs, and to trigger intelligent service. Wherein, there are multiple network state machines, network protocol adapters and service switch equipments of different networks for realizing access to different networks. In addition, it is also possible to provide a soft switch equipment to a NGN network for access, the soft switch equipment communicates, through a SIP protocol adapter, with the PARLAY state machine.

Figure 2:
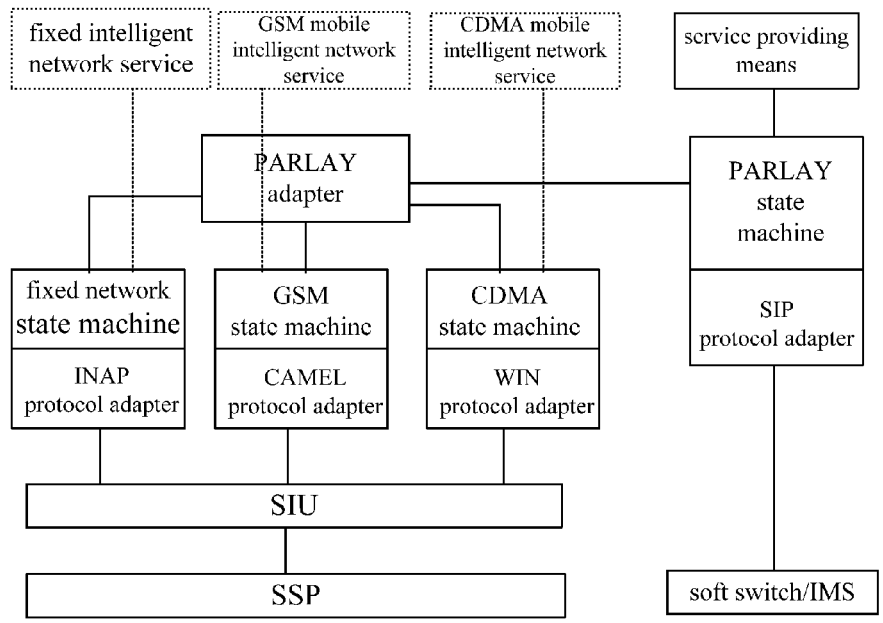
FIG. 2 is a schematic view of a particular embodiment of the uniform service access system.

FIG. 2 shows a particular embodiment of the access system as mentioned above, which supports the access of a fixed intelligent network service, a GSM mobile intelligent network service, and a CDMA mobile intelligent network service. The corresponding network state machines are fixed network state machines, GSM state machines, CDMA state machines, respectively, and the network protocol adapters are INAP protocol adapters, CAMEL protocol adapters, WIN protocol adapters, respectively. The service switch equipment is consisted of an SSP and an SIU, wherein the SSP is configured to realize triggering of a service switch and an intelligent service, the SIU is configured to realize the conversion of information transmission formats between the SSP and the network protocol adapter, the No. 7 signaling is used for communication between the SIU and the SSP, TCP/IP protocol is used for communication between the SIU and the network protocol adapter.

Figure 3:
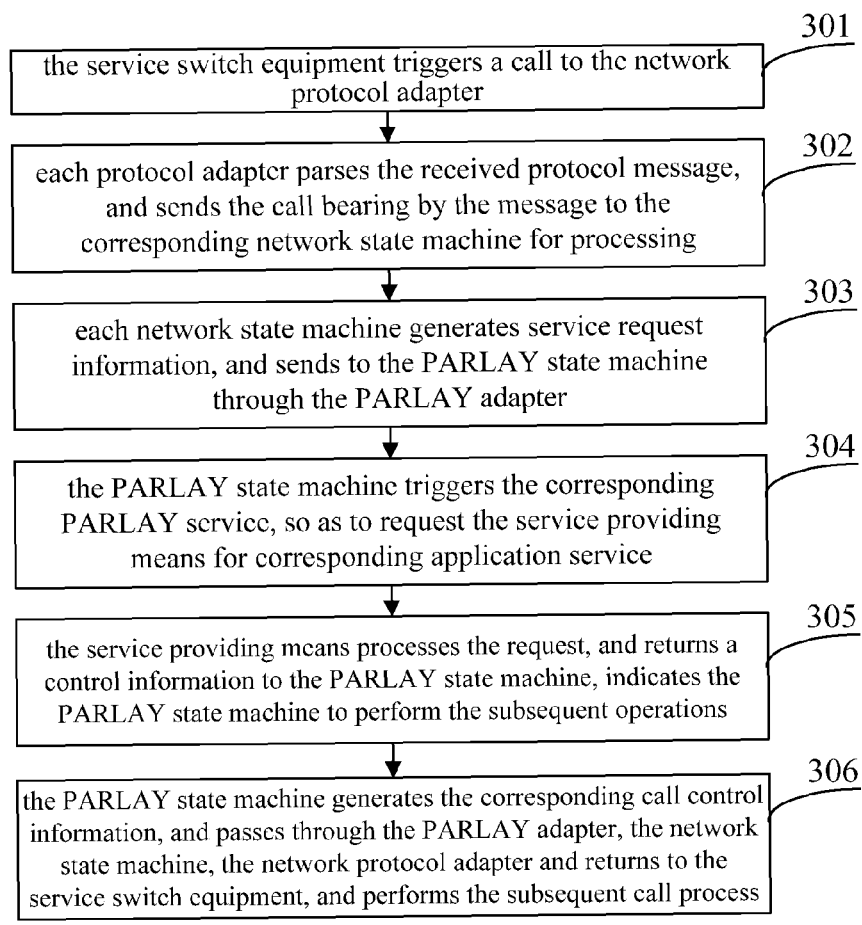
FIG. 3 is a flow chart of a service access of the uniform service access system.

A service access process according to the access system shown in FIG. 2 is described with reference to FIG. 3; the service access process comprises the following steps:

Step 301, the service switch equipment triggers a call to the network protocol adapter.

For example, after receiving the call from a network terminal, a GSM network, a fixed telephone network and a CDMA network trigger intelligent network service through respective SSP of each access network, the SSP transmits signaling triggering the intelligent service to the SIU unit through the No. 7 signaling, and the SIU unit encapsulates the No. 7 signaling into a TCP/IP protocol message and then sends to the network protocol adapter for processing.

The network protocol adapter comprises protocol adapters corresponding to individual networks. For example, the INAP protocol adapter corresponds to the fixed telephone network, the CAMEL protocol adapter corresponds to the GSM network, and the WIN protocol adapter corresponds to the CDMA network.

What is to be described herein is that if the call is performed through a soft switch network, due to a SIP protocol being used by the network, the soft switch network directly triggers the SIP protocol adapter without being parsed by the SIU unit.

Step 302, each network protocol adapter parses the received protocol message, and sends the call borne by the message to the corresponding network state machine for processing, the network state machine accomplishes the functions related to call control, such as, call session management and call state transference management. Wherein, each network protocol adapter and each network state machine use internal protocol to communicate with each other.

For example, the INAP protocol adapter sends the call into the fixed network state machine; the CAMEL protocol adapter sends the call into the GSM state machine; the WIN protocol adapter sends the call into the CDMA state machine.

Step 303, each network state machine, such as the fixed network state machine, the GSM state machine, the CDMA state machine, generates service request information according to the call, and sends the request information to the PARLAY adapter, and the PARLAY adapter converts the received request information into a format required by the PARLAY state machine and sends to the PARLAY state machine.

Wherein, because the SIP protocol adapter and the PARLAY state machine both use the SIP protocol, the call can be directly triggered to the PARLAY state machine.

As shown by the dashed line in FIG. 2, the fixed network state machine, the GSM state machine and the CDMA state machine may also directly trigger the service corresponding to each state machine, for example, the fixed network state machine triggers the fixed intelligent network service, the GSM state machine triggers the GSM mobile intelligent network service, the CDMA state machine triggers the CDMA mobile intelligent network service. In the embodiment, these three state machines need to trigger the PARLAY adapter in order to realize the object of one service multiple protocol access set forth by the present invention. Wherein, in order to realize a smooth upgrading of a network, a new service can be provided by the system according to the present invention, each intelligent service of each original network can be provided by the system according to the present invention gradually, and can be still provided by each original network in a certain period. Thereby, after receiving the call, each network state machine first judges the call has a contract with either the service providing means of the system provided by the present invention or has a contract with each network service providing means of each original network, so as to decide to either perform the subsequent step 304 or trigger the network service providing means of the network to which it belongs for providing intelligent service.

Step 304, after receiving the service request information, according to the service in the contract of a terminal, the PARLAY state machine triggers the corresponding PARLAY service, so as to request the service providing means for corresponding application service.

Step 305, the service providing means processes the request, and invokes the corresponding application service according to the service request, performs service logic processing and returns a control information to the PARLAY state machine, indicates the PARLAY state machine to perform the subsequent operations.

Step 306, the PARLAY state machine generates the corresponding call control information, and passes through the PARLAY adapter, the network state machine, the network protocol adapter and returns to the service switch equipment, and the SSP of the service switch equipment performs the subsequent call process.

During information transmission process, in order to realize that the response information can be correctly returned, related network equipment identifiers, such as the network protocol adapter, network state machine identifier, can be added to the uplink information, so as to guarantee that the response message can be correctly returned. When the information is sent by the service providing means actively, the necessary network state machine identifier is set in the sent information, that is to say, the message can be sent to the network to which the network state machine belongs.

In addition, when the network terminal is a terminal of a wide band network, such as a user terminal using the soft switch equipment or IMS equipment for convergence, the terminal can directly communicate with the PARLAY state machine through the SIP protocol adapter due to using the SIP protocol, the description of which is omitted here.

It can be seen from the above description that one service providing means can be uniformly used for different networks by the uniform service access system and access method, thus it can be realized to develop a service only once, which can however access to and be invoked in multiple networks, which substantially reduces repeated development and is convenient for maintenance.

Above description is intended to illustrate the preferred embodiments of the present invention, not to limit the scope of the present invention thereof.

What is claimed is:

1. A uniform service access network system comprising:
a plurality of independent networks each including a network state machine, a network protocol adapter, and a service switch equipment;
a service providing means configured to store application service information, and to process a service request from any of the plurality of independent networks; and
a PARLAY state machine configured to trigger an application service of the service providing means according to service request information from a PARLAY adapter, and to generate call control information according to the application service information and return to the PARLAY adapter; wherein
the PARLAY adapter is configured to realize a conversion of information transmission formats between the PARLAY state machine and a network state machine of any of the plurality of independent networks;
the network state machine is configured to generate the service request information according to a call from a network protocol adapter at a same network and send to the PARLAY adapter, and to send call control information from the PARLAY adapter to the network protocol adapter;
the network protocol adapter is configured to realize a conversion of information transmission formats between the network state machine and a service switch equipment at the same network; and
the service switch equipment is configured to trigger the application service to report the network protocol adapter according to a call from a network terminal, and to control a current call according to the call control information from the network protocol adapter, wherein the service switch equipment comprises a Service Switch Point (SSP) and a System Interface Unit (SIU), the SSP is configured to realize triggering of a service switch and an intelligent service, the SIU is configured to realize the conversion of information transmission formats between the SSP and the network protocol adapter.

2. The system according to claim 1, wherein the network state machine and the network protocol adapter comprise at least one of the following combinations:
a fixed network state machine and an Intelligent Network Application Protocol, INAP, protocol adapter, a Global System for Mobile Communication, GSM, state machine and a Customised Applications for Mobile Enhanced Logic, CAMEL, protocol adapter, and a Code Division Multiple Access, CDMA, state machine and a Wireless Intelligent Network, WIN, protocol adapter.

3. The system according to claim 1, further comprising:
a Session Initiation Protocol, SIP, protocol adapter, configured to convert the information transmission formats between a soft switch equipment and the PARLAY state machine;
the soft switch equipment, configured to trigger the application service to report the SIP protocol adapter according to a call from the soft switch network.

4. An access method for a uniform service access system, which includes a service providing means configured to store application service information, a PARLAY state machine configured to trigger an application service of the service providing means according to service request information from a PARLAY adapter, and a plurality of independent networks each including a network state machine, a network protocol adapter, and a service switch equipment, wherein the service providing means is configured to process a service request from any of the plurality of independent networks, the method comprising the following steps:
- A. a service switch equipment of any one of the plurality of independent networks triggering a service according to a call from a network terminal at the same network, converting, the call through a network protocol adapter, into a format required by a network state machine at the same network and transmitting the call to the network state machine;
- B. the network state machine converting, through the PARLAY adapter, the call information into a format required by the PARLAY state machine and transmitting the call information to the PARLAY state machine;
- C. the PARLAY state machine triggering an application service on a service providing means, and the service providing means dispatching a call control to the PARLAY state machine;
- D. the PARLAY state machine converting, through the PARLAY protocol adapter, the call control into a format required by the network state machine and transmitting to the network state machine; and
- E. the network state machine converting, through the network protocol adapter, the call control into a format required by the service switch equipment and transmitting the call control to the service switch equipment to perform subsequent call;

wherein the service switch equipment comprises a Service Switch Point (SSP) and a System Interface Unit (SIU), the SSP is configured to realize triggering of a service switch and an intelligent service, the SIU is configured to realize the conversion of information transmission formats between the SSP and the network protocol adapter.

5. The access method according to claim 4, prior to step B, further comprising:
when the network state machine judges that the call has a contract with the service providing means, performing step B.

6. The access method according to claim 5, further comprising:
when the network state machine judges that the call has a contract with the network service providing means of the network to which the network state machine belongs, triggering the call being to the network service providing means of the network to which the network state machine belongs.

7. The access method according to claim 4, wherein step A, i.e., the service switch equipment triggering the service according to the call from the network terminal, and converting, through the network protocol adapter, into the format required by the network state machine, comprises:
the service switch equipment triggering the service according to the call of the network terminal, and a System Interface Unit, SIU, converting NO.7 signaling bearing the call into Transfer Control Protocol, TCP/Internet Protocol, IP protocol message and sending to the network protocol adapter;
the network protocol adapter parsing the TCP/IP protocol message, and converting into an internal format required by the network state machine.

8. The access method according to claim 4, wherein step E, i.e., the network state machine converting, through the network protocol adapter; into the format required by the service switch equipment, and transmitting to the service switch equipment, comprises:
the network protocol adapter converting a message of internal format into TCP/IP protocol message, and sending to the SIU; and
the SIU converting the TCP/IP protocol message into the NO.7 signaling format, and transmitting to the service switch equipment.

* * * * *